July 10, 1962
R. BREHER
3,043,555
GATE VALVE HAVING AN UPSETTABLE SEALING
MEMBER OF RUBBER ELASTIC MATERIAL
Filed Oct. 29, 1958
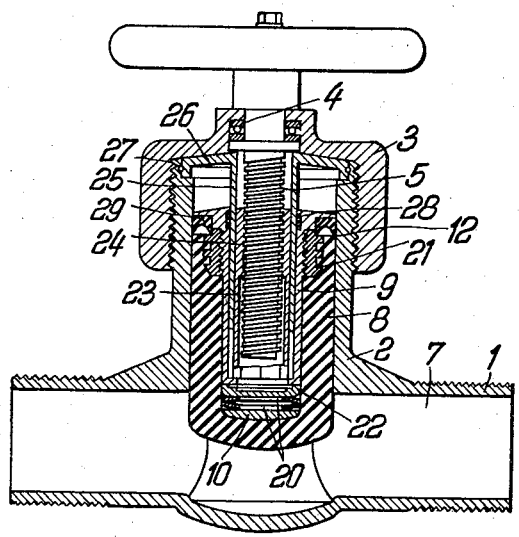
Inventor:
RUDOLF BREHER
By *Hville*
ATTORNEY

United States Patent Office 3,043,555
Patented July 10, 1962

3,043,555
GATE VALVE HAVING AN UPSETTABLE SEALING MEMBER OF RUBBER ELASTIC MATERIAL
Rudolf Breher, Bad Oeynhausen, Germany, assignor to Friedrich Stubbe, Vlotho (Weser), Germany
Filed Oct. 29, 1958, Ser. No. 770,414
Claims priority, application Germany Nov. 15, 1957
3 Claims. (Cl. 251—187)

The instant invention relates to gate valves for hydraulic lines of which the sealing gate member is of a rubbery resilient material of the hardness of soft rubber coating at its trailing end, in its movement across the hydraulic line to closure thereof, with its actuating spindle so that the gate is moved first to the closing position and is then upset tightly to seal the line.

Sealing the valve region through which the actuating spindle of prior known gate valves extends from the hydraulic line may be by providing the gate with either a sealing or packing ring or collar to result in a tight fit between the spindle and the interior valve wall, or a diaphragm extending across the bore in which the spindle operates, of which diaphragm the peripheral regions are clamped in, or otherwise affixed in the valve body. The first type of spindle packing requires relatively large rings or collars of which the sealing effect is not sufficiently reliable, and in the second type satisfactory sealing is difficult to obtain, particularly at the higher pressures, because the diaphragm is too heavily loaded as a rule. The simultaneous use of both types of spindle sealing has, likewise, not been too satisfactory.

An object of the instant invention is to provide a gate valve satisfactorily and permanently rendered liquid tight and non-leaking by relatively simple means.

Another object of the invention is to provide a gate valve with a sealing telescoping spindle arrangement in which a guide sleeve disposed below the valve bonnet and supported at its upper end on the valve body cooperates with a sleeve integral with the sealing gate.

I accomplish the foregoing, and other objects, by providing a sleeve extending rearwardly from the trailing end region of the gate and another sleeve extending from the bonnet or valve cap in such manner that the two sleeves constitute a pair of telescoping tubes. The operating spindle extends axially through the telescoping sleeves, and preferable the feed nut is fixedly mounted in the trailing sleeve of the sealing gate. Thus, the spindle, coacting with the feed nut, on rotation feeds the gate in the appropriate direction, and on closure, upsetting force is transmitted to such sealing member through the sleeve attached to its trailing region. While as supplementary to such sealing by the telescopic arrangement of my invention, ring sealing of the movable gate may be retained, particularly where the hydraulic medium flowing through the gate valve contains heavy deposits and impurities, I prefer to limit the sealing to the telescoping means of my invention. This is because with such telescoping means the gate is loaded on opposite surfaces and forces transmitted by the spindle to the valve cap or bonnet are appreciably less and the demands by way of stress on the valve body are correspondingly less. In addition, the actuating spindle is relatively remote in position from the hydraulic medium flowing through the line passages of the valve, which of itself not only is a decided advantage but also permits effective lubrication thereof. In addition, the sleeve connected to the sealing member, or at least a considerable portion thereof, is a stiffening sleeve embedded in the trailing region of the upsettable member, which, in turn, encircles this sleeve. An appropriately shaped sleevelike mount carries the spindle feed nut at its free end and projects into the free end of the guide sleeve clamped between the valve cap or bonnet and the valve body. This embodiment of my invention has the advantage that the overall height of the valve may be relatively small, and is less than usual.

The gate valve of my invention will more readily be understood from the following description of an illustrative embodiment thereof with reference to the annexed drawing in which the sole FIGURE is an elevational section through the illustrative embodiment.

The disclosed embodiment is a gate valve of which the overall valve height is kept to a minimum. The gate valve comprises a housing or body 1 with an integral elongated section of pipe 2 forming the chamber, and a bonnet or cap 3 threadable on pipe 2 and having a central aperture 4 for the actuating spindle 5 provided, for example, with the customary handwheel at its external end region. Valve body 1 and bonnet 3 may be of metal or of an appropriate synthetic material. The valve body has passages 7, connectable in a hydraulic line, through which the flow of the hydraulic medium is controlled by a gate 8 from complete stoppage to maximum flow.

Gate 8 is of soft rubber, or some other material of similar upsettability. As is well known, rubber, is incompressible but will, with the application of pressure, deform until it completely fills an enclosure for example, and when the enclosure is filled will build up pressure against the enclosure walls; and when the pressure is removed will tend to restore to its original shape. Per se the incompressibility of rubber has no relation to its upsettability in that upsetting occurs only when rubber of greater or lesser softness is subjected to pressure and is free to move at right angles to the direction of application of the pressure. By a "soft" rubber or similar substance, I mean rubber with a Shore hardness of 55 to perhaps 85, and preferably about 65. Actually these values include both what are generally termed "soft" and "semi-soft" rubber, as contrasted to "very soft" rubber on the one hand, and "semi-hard" and "hard" on the other.

The sealing member or gate 8 may be round, oval or any other flattened cross-section, and within its hollow interior a stiffening insert 9 is inserted which is preferably in the form of a cylinder open at both ends and of metal or other appropriate material. It will be noted that the internal diameter of insert 9 is in excess of the outer diameter of spindle 5 so that the lower end of the spindle can readily enter into the hollow interior thereof as the gate is withdrawn to its passage opening position. It will further be noted that the outer diameter of the stiffening insert is about half that of the upsettable member 8; that is, there is an adequate volume of rubber to be upset radially of the insert. So also the full length of the hollow interior of sealing member 8 is not occupied by stiffening insert 9 which is supplemented by a bottom plate 10, preferably dished downwardly at its central region, across the lower end thereof. Below plate 10 there is a thickness of the upsettable rubber 8 substantially equal to that radially of insert 9. It is to be particularly noted that the insert 9 is not affixed to sealing member 8 but is capable of relative movement so that member 8 may be upset. The lower length portion of sealing member 8 is about equal to, and preferably somewhat greater than, the diameter of the flow passages 7.

The bottom plate 10 is spaced from the lower end of insert 9 by a pair of centrally disposed plate springs 20, which are preferably curved toward each other with their peripheries engaging each other. A guard or holding ring 21, embedded in the trailing end region of the sealing member 8, holds the insert 9 within the sealing member, for example, by an internal thread in such ring engaging the upper, externally threaded, end of insert 9. At its forward and lower end, the insert 9 is closed by a bottom plate 22 serving also as the upper support surface of plate springs 21. Bottom plate 22 is also connected to a concentric inner sleeve 23 of which the trailing region, at its interior, is formed as the feed nut 24 for valve spindle 5. Thus, the pressure or traction of spindle 5 by way of feed nut 24, inner sleeve 23, and bottom plate 22 is transmitted to stiffening insert 9, the portion of which below guard ring 21 permits of relative motion of the adjacent portions of the sealing member 8. In the annular region between the inner sleeve 23 with integral feed nut 24, and the stiffening insert 9, a guide sleeve 25 depends from a cover plate 26 terminating the upper end of the pipe portion 2 of the valve. Cover plate 26 is supported on an annular internal shoulder of pipe 2, with a hydraulic seal between the pipe and cover plate being provided by packing ring 27. Hydraulic sealing is provided between the guide sleeve 25 and the stiffening insert 9 by means of one or more collars 28. The trailing end region of sealing member 8 is hydraulically sealed with respect to its guiding internal surface of the valve by an obturator 29.

Where the valve body 1 is of a synthetic material, or made by die casting, the inner surface of pipe portion 2 by which the upsettable sealing member 8 is guided, is sufficiently smooth to permit unobstructed sliding thereon of the obturator 29. If the valve body be cast iron or steel, etc., finishing of such inner surface of pipe portion 2 is, however, required. In the latter case of a so finished surface, the obturator 29 can generally be dispensed with, particularly when the liquid medium flowing in passages 7 contains no components which might form a deposit. Avoidance of such obturator particularly recommends itself with higher operating pressures, because the sealing member is thereby loaded axially from both top and bottom, resulting in a differential effect decreasing the force transmitted by the spindle to the valve casing and bonnet.

The hollow regions bounded by sealing member 8 and sleeves 9 and 25 may be filled with lubricating material which, at the same time contributes to increase the tightness of the sealing effects produced by sealing collar 28.

Where the sealing member 8 is of circular cross-section, it will be expedient to prevent unnecessary rotary movement thereof as the member is moved axially. This may be accomplished by appropriate guide means, known in the art, or by imparting to the telescoping sleeves cross-sections departing from the true circular forms. To give added anchorage to the advancing end region of the sealing member 8 in its closing position, the region of passages 7 registering therewith may be grooved or depressed as shown, but not referenced.

It is to be understood that the above-described embodiment of the gate valves of my invention is illustrative and not limitative, and that numerous modifications can be made therein without departing from the spirit and scope of my invention.

What I claim is:
1. A gate valve for hydraulic lines comprising a valve body, a bonnet on the body, a spindle extending through the bonnet into the interior of the body, a pair of aligned passages through the body, a guide sleeve dependent from the bonnet and of a predetermined length, a cup-shaped gate member of upsettable rubber elastic material of soft rubber hardness, and means acting on the trailing region of the gate member to impart passage closing and opening motion and upsetting pressure in the passage closing position to the gate member comprising a reinforcing sleeve of which the trailing end region is embedded in the trailing region of the gate member, the reinforcing sleeve being of an axial length less than the depth of the interior of the cup-shaped gate member so that the leading end of the reinforcing sleeve, in the passage closing direction, trails the leading end of the interior of the gate member, the reinforcing sleeve being slidable on the guide sleeve and telescoping therewith, an inner sleeve within the reinforcing sleeve and the guide sleeve, a feed nut integral with the trailing region of the inner sleeve cooperating with the spindle, and a radial flange at the leading end of the reinforcing sleeve and engaging the leading end of the inner sleeve to move it axially on rotation of the spindle.

2. The gate valve according to claim 1 in which the radial flange defines a central aperture through which the spindle can extend, a first rigid plate across the leading end of the reinforcing sleeve and engageable by the leading end of the spindle, a second rigid plate within the interior of the gate member spaced from the first rigid plate and supported on the interior bottom of the gate member, and a pair of oppositely curved arcuate plate springs positioned between the first and second rigid plates with the high portion of one of the springs of the pair engaging the first rigid plate and the high portion of the other spring engages the second rigid plate when the spindle extends through the central aperture and bears against the first rigid plate, the corresponding ends of the springs of the pair engaging each other.

3. The gate valve according to claim 1 in which a first dished rigid plate within the hollow interior of the upsettable gate member closes the leading end of the inner sleeve, a second dished rigid plate within the closed end of the hollow interior region of the upsettable cup-shaped member and is supported on the bottom of the cup-shaped member, and a pair of oppositely curved, mutually coacting plate springs is biased between the first and second dished plates.

References Cited in the file of this patent
UNITED STATES PATENTS

| | | |
|---|---|---|
| 372,200 | Briggs | Oct. 25, 1887 |
| 1,087,021 | Kerbaugh | Feb. 10, 1914 |
| 1,706,123 | McBride | Mar. 19, 1929 |
| 2,290,251 | Saunders | July 21, 1942 |

FOREIGN PATENTS

| | | |
|---|---|---|
| 796,823 | Great Britain | June 18, 1958 |